United States Patent
Kim et al.

(10) Patent No.: US 10,231,203 B2
(45) Date of Patent: Mar. 12, 2019

(54) SERVICE REQUEST METHOD, AND USER EQUIPMENT

(71) Applicant: LG ELECTRONICS INC., Seoul (KR)

(72) Inventors: Jaehyun Kim, Seoul (KR); Laeyoung Kim, Seoul (KR); Taehyeon Kim, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 120 days.

(21) Appl. No.: 14/904,540

(22) PCT Filed: Jul. 17, 2014

(86) PCT No.: PCT/KR2014/006475
§ 371 (c)(1),
(2) Date: Jan. 12, 2016

(87) PCT Pub. No.: WO2015/009069
PCT Pub. Date: Jan. 22, 2015

(65) Prior Publication Data
US 2016/0150496 A1    May 26, 2016

Related U.S. Application Data

(60) Provisional application No. 61/847,589, filed on Jul. 18, 2013, provisional application No. 61/861,430, (Continued)

(51) Int. Cl.
*H04W 60/00* (2009.01)
*H04W 48/06* (2009.01)
(Continued)

(52) U.S. Cl.
CPC ............ *H04W 60/04* (2013.01); *H04W 8/02* (2013.01); *H04W 28/0226* (2013.01);
(Continued)

(58) Field of Classification Search
CPC . H04W 60/00; H04W 28/0226; H04W 60/04; H04W 28/02; H04W 48/04;
(Continued)

(56) References Cited

U.S. PATENT DOCUMENTS 9,307,471 B1 * 4/2016 Park .................... H04W 36/22
9,473,984 B2 * 10/2016 Xu ..................... H04W 28/0289
(Continued)

FOREIGN PATENT DOCUMENTS

KR    10-2009-0021046 A    2/2009

OTHER PUBLICATIONS

3GPP TS 24.301 V12.1.0, Non-Access-Stratum (NAS) protocol for Evolved Packet System (EPS), Stage 3 (Release 12), Jun. 27, 2013 (http://www.3gpp.org/Dynareport/24301.htm) See pp. 21, 39, 54-56, 60, 68, 92-93, 100, 141-142, 150.
(Continued)

*Primary Examiner* — Khawar Iqbal
(74) *Attorney, Agent, or Firm* — Dentons US LLP

(57) ABSTRACT

The present description discloses a service request method. The service request method comprises the steps of: increasing a counter whenever a service request message has been transmitted multiple times to a first network node in a first public land mobile network (PLMN), but an acceptance message has not been received by the time a first timer expires; comparing the counter value with an upper threshold value; and running a second timer if the counter value is equal to or greater than the upper threshold value, wherein the transmission of the service request message can be prevented until the second timer expires.

10 Claims, 17 Drawing Sheets

Related U.S. Application Data filed on Aug. 2, 2013, provisional application No. 61/872,768, filed on Sep. 2, 2013.

(51) Int. Cl.

| | | |
|---|---|---|
| *H04W 28/02* | (2009.01) | |
| *H04W 60/04* | (2009.01) | |
| *H04W 8/02* | (2009.01) | |
| *H04W 48/18* | (2009.01) | |
| *H04W 48/04* | (2009.01) | |
| *H04W 84/04* | (2009.01) | |
| *H04W 48/14* | (2009.01) | |
| *H04W 8/04* | (2009.01) | |

(52) U.S. Cl.
CPC ........... *H04W 48/04* (2013.01); *H04W 48/18* (2013.01); *H04W 60/00* (2013.01); *H04W 8/04* (2013.01); *H04W 48/14* (2013.01); *H04W 84/042* (2013.01)

(58) Field of Classification Search
CPC ..... H04W 8/02; H04W 84/042; H04W 48/14; H04W 48/18; H04W 48/06; H04W 28/0231; H04W 48/16
USPC ........................................................ 455/435.1
See application file for complete search history.

(56) References Cited

U.S. PATENT DOCUMENTS

| | | | | |
|---|---|---|---|---|
| 9,491,694 | B2* | 11/2016 | Yi ........................ | H04W 48/16 |
| 9,717,044 | B2* | 7/2017 | Madasamy ........... | H04W 48/18 |
| 2010/0165940 | A1 | 7/2010 | Watfa et al. | |
| 2012/0178457 | A1* | 7/2012 | Liao ..................... | H04W 76/18 |
| | | | | 455/437 |
| 2012/0214493 | A1* | 8/2012 | Suh .................... | H04W 36/0066 |
| | | | | 455/437 |
| 2013/0023265 | A1* | 1/2013 | Swaminathan ....... | H04W 76/18 |
| | | | | 455/423 |
| 2013/0059586 | A1* | 3/2013 | Hao ..................... | H04W 48/12 |
| | | | | 455/436 |
| 2013/0315072 | A1* | 11/2013 | Hietalahti ............. | H04W 76/10 |
| | | | | 370/242 |
| 2014/0045509 | A1* | 2/2014 | Parr ..................... | H04W 76/18 |
| | | | | 455/450 |
| 2014/0269275 | A1* | 9/2014 | Jun ...................... | H04W 36/22 |
| | | | | 370/230 |
| 2015/0058899 | A1* | 2/2015 | Liu .................. | H04N 21/43615 |
| | | | | 725/86 |
| 2015/0181525 | A1* | 6/2015 | Gupta ................ | H04W 52/0225 |
| | | | | 370/252 |
| 2015/0201395 | A1* | 7/2015 | Jeong ................... | H04W 64/00 |
| | | | | 455/456.1 |
| 2015/0245258 | A1* | 8/2015 | Kim ..................... | H04W 48/18 |
| | | | | 370/331 |
| 2015/0271763 | A1* | 9/2015 | Balachandran ........ | H04B 17/23 |
| | | | | 370/338 |
| 2015/0296444 | A1* | 10/2015 | Sfar ..................... | H04W 76/19 |
| | | | | 455/434 |
| 2016/0113041 | A1* | 4/2016 | Smith ................... | H04W 72/10 |
| | | | | 455/404.1 |
| 2016/0219503 | A1* | 7/2016 | Kim ...................... | H04W 8/065 |
| 2017/0181084 | A1* | 6/2017 | Sun ................... | H04W 52/0235 |
| 2017/0245188 | A1* | 8/2017 | Kim ...................... | H04W 24/04 |
| 2017/0257791 | A1* | 9/2017 | Rajadurai ......... | H04W 28/0205 |
| 2017/0325194 | A1* | 11/2017 | Diachina .............. | H04W 68/02 |
| 2018/0103391 | A1* | 4/2018 | Lu ...................... | H04W 28/0289 |
| 2018/0242213 | A1* | 8/2018 | Liu ....................... | H04W 8/082 |

OTHER PUBLICATIONS

3GPP TS 23.401 V12.1.0,General Packet Radio Service (GPRS) enhancements for Evolved Universal Terrestrial Radio Access Network (E-UTRAN) access (Release 12), Jun. 24, 2013 (http://www.3gpp.org/DynaReport/23401.htm) See pp. 20-55.

* cited by examiner

SERVICE REQUEST METHOD, AND USER EQUIPMENT

This application is a 35 USC § 371 National Stage entry of International Application No. PCT/KR2014/006475 filed on Jul. 17, 2014, which claims priority to U.S. Provisional Application No. 61/847,589, filed on Jul. 18, 2013, U.S. Provisional Application No. 61/861,430, filed on Aug. 2, 2013, and U.S. Provisional Application No. 61/872,768, filed on Sep. 2, 2013, all of which are incorporated by reference in their entirety herein.

FIELD OF THE INVENTION

The present invention relates to mobile communication.

RELATED ART

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

As illustrated, an evolved UMTS terrestrial radio access network (E-UTRAN) is connected to an evolved packet core (EPC). The E-UTRAN is a radio access network defined after 3GPP release-8, and is also called a 4th generation (4G) (i.e., LTE) network. A radio access network before the LTE, i.e., a 3rd generation (3G) radio access network, is a UTRAN.

The E-UTRAN includes a base station (BS) (or eNodeB) 20 which provides a control plane and a user plane to a user equipment (UE). The BSs (or eNodeBs) 20 may be interconnected by means of an X2 interface.

Layers of a radio interface protocol between the UE and the BS (or eNodeB) 20 can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Meanwhile, the EPC may include various constitutional elements. Among them, a mobility management entity (MME) 51, a serving gateway (S-GW) 52, a packet data network gateway (PDN GW) 53, and a home subscriber server (HSS) 54 are illustrated in FIG. 1.

The BS (or eNodeB) 20 is connected to the MME 51 of the EPC through an S1 interface, and is connected to the S-GW 52 through S1-U.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6 exemplarily illustrates a network inability state.

As illustrated in FIG. 6, numerous UEs 10a, 10b, 10c, and 10d are present in the coverage of the eNodeB 20 and attempt data transmission and reception. As a result, when the eNodeB 20 is congested, downlink data from the eNodeB 20 to the UEs or uplink data from the UEs to the eNodeB 20 are not normally transmitted but unsuccessfully transmitted.

In this case, when uplink data from specific UE 10a is a control signal toward the MME 51, for example, an attach request, a tracking area update (TAU) request, a routing area update (RAU) request, or a service request, the UE 10a experiences service interruption.

Similarly, when the MME 51 is in an inability state due to congestion, and the like, the control signal from the specific UE 10a, for example, the attach request, the tracking area update (TAU) request, the routing area update (RAU) request, or the service request may not normally be transferred to the MME 51, and as a result, the UE 10a experiences service interruption.

SUMMARY OF THE INVENTION

Accordingly, one disclosure of the specification have been made in an effort to provide a scheme that solves the problem.

In order to achieve the aforementioned object, one disclosure of the specification provides a method for service request. The method may comprise: increasing a counter when a response message is not received until a first timer is expired, after transmitting a service request message multiple times to a first network node in a first public land mobile network (PLMN); comparing a value of the counter with an upper threshold; and running a second timer if the value of the counter is greater than or equal to the upper threshold. a transmission of the service request message are prevented until the second timer has expired.

The method may further comprise: transmitting the service request message if a service request is required and if the value of the counter is less than the threshold.

The method may further comprise: transmitting the service request message if a service request is required after the second timer has been expired.

The method may further comprise: transmitting an access request message or a location update request message to a second network node in a second PLMN after the second timer has been expired and transmitting a service request message to the second network node. The access request message is an attach request message, and the location update request message is a tracking area update (TAU) request message or a routing area update (RAU) request message.

The first timer is a T3402 timer or a T3302 timer. The second timer is a T3402 timer or a T3302 timer.

The service request message corresponds to at least one of a service request message and an extended service request message.

In order to achieve the aforementioned object, one disclosure of the specification provides a user equipment (UE). The UE may comprise: a transceiver; and a processor configured to increase a counter when a response message is not received until a first timer is expired, after transmitting, through the transceiver, a service request message multiple times to a first network node in a first public land mobile network (PLMN) and compare a value of the counter with an upper threshold. The processor may be further configured to run a second timer if the value of the counter is greater than or equal to the threshold such that a transmission of the service request message are prevented until the second timer has expired.

According to the disclosure of the specification, the problem in the related art is solved.

DESCRIPTION OF EXEMPLARY EMBODIMENTS

Figure 1:
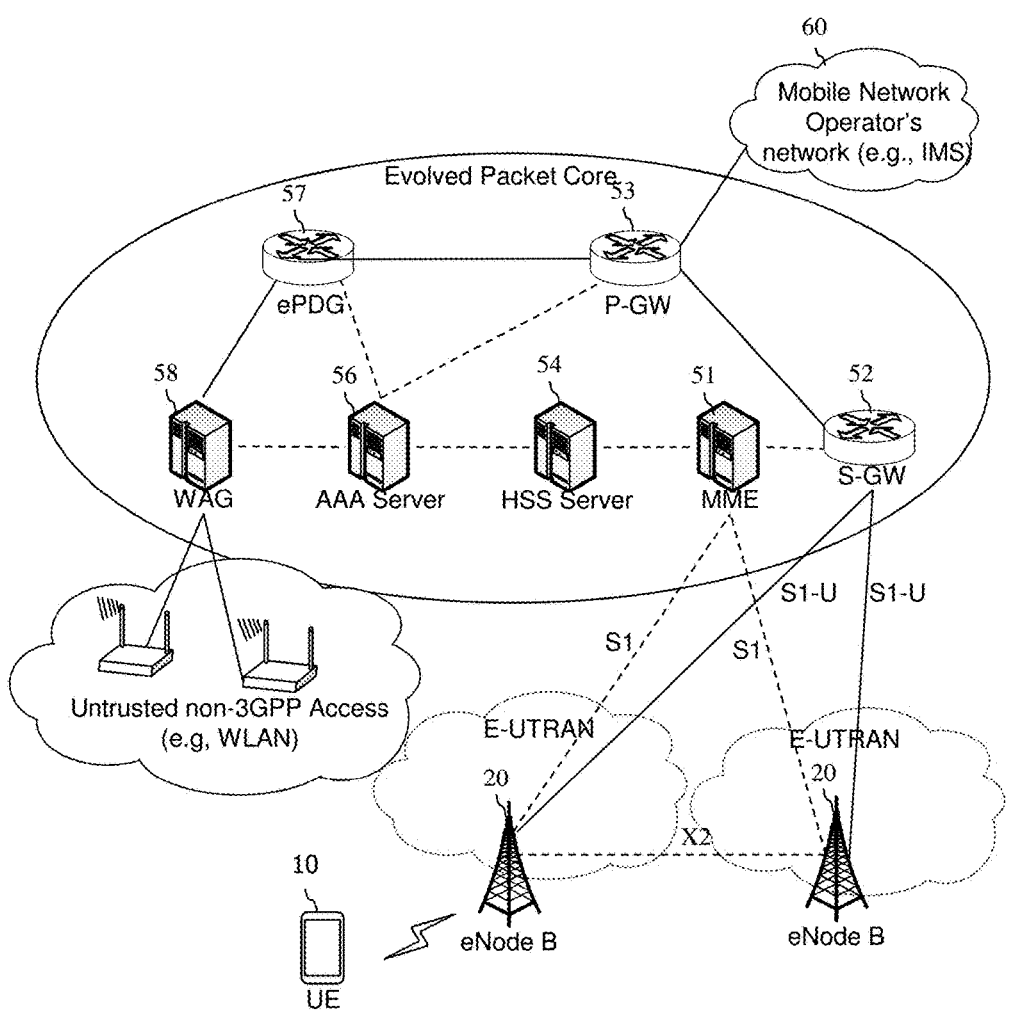
FIG. 1 shows the configuration of an evolved mobile communication network.
Figure 2:
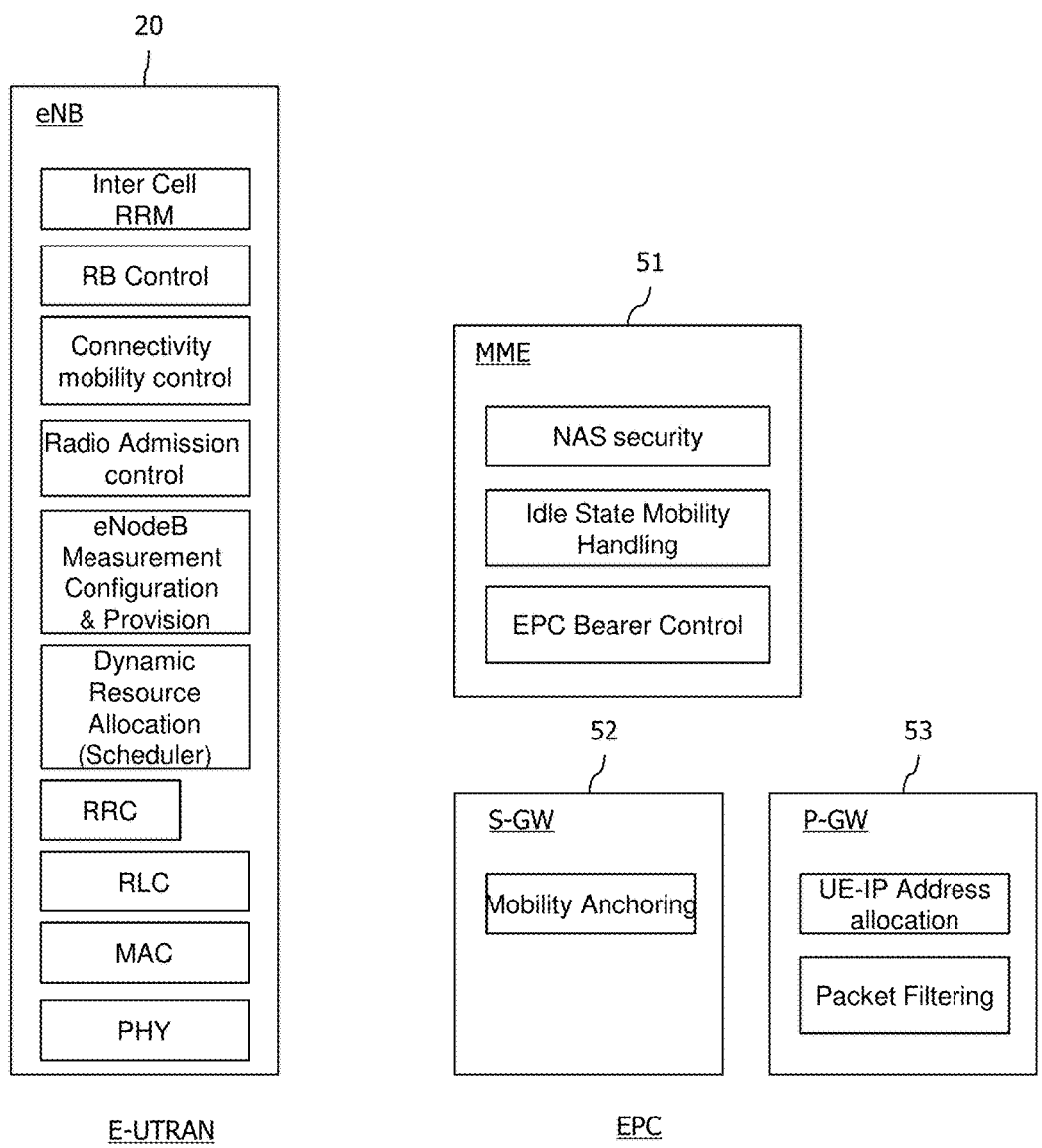
FIG. 2 is an exemplary diagram showing the architecture of a common E-UTRAN and a common EPC.
Figure 3:
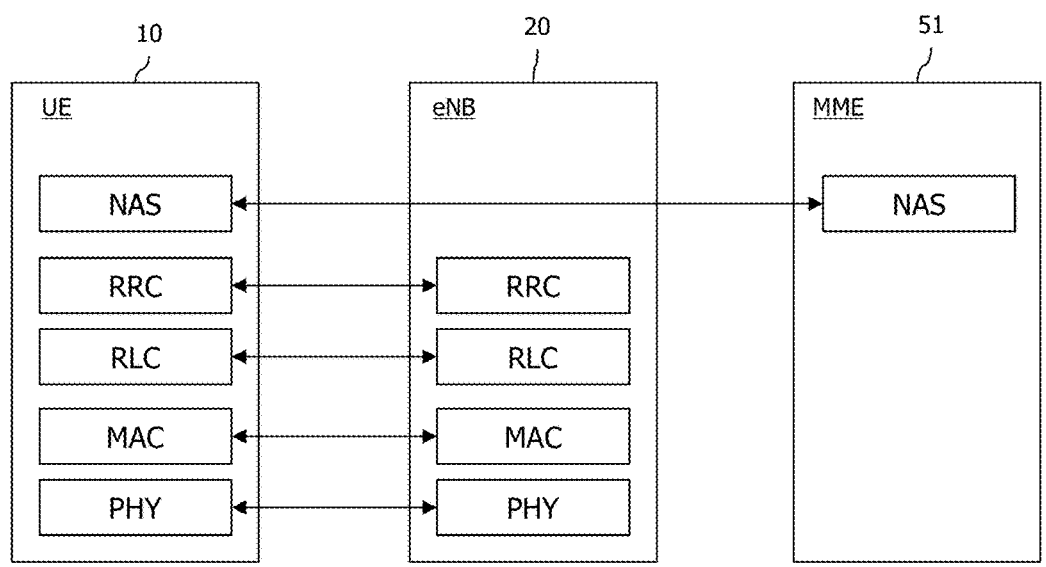
FIG. 3 is an exemplary diagram showing the structure of a radio interface protocol in a control plane between UE and an eNodeB.
Figure 4:
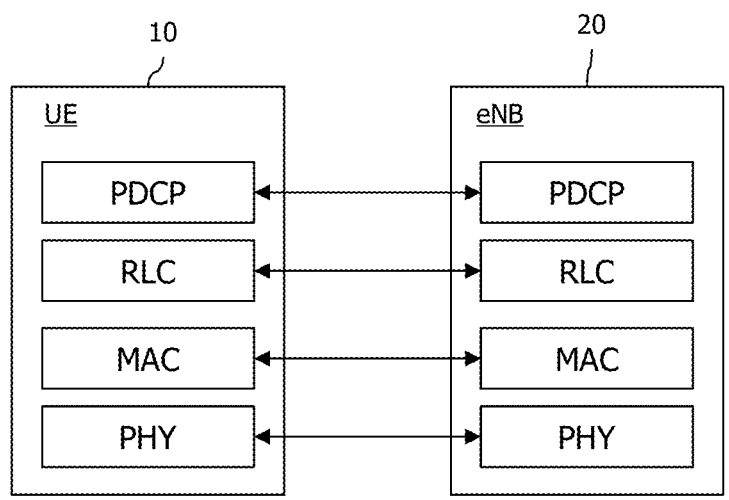
FIG. 4 is another exemplary diagram showing the structure of a radio interface protocol in a user plane between UE and a base station.
Figure 5:
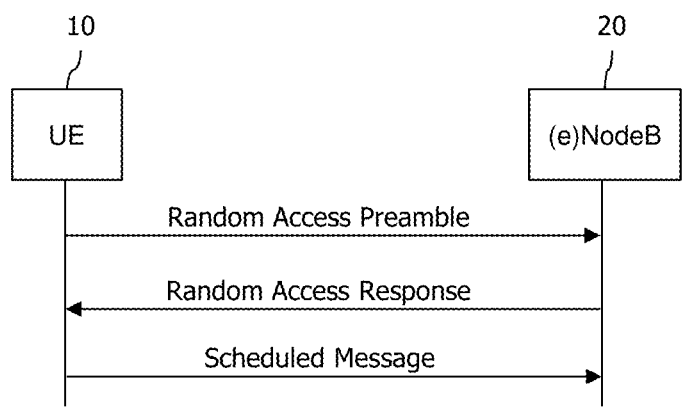
FIG. 5 is a flowchart illustrating a random access process in 3GPP LTE.
Figure 6:
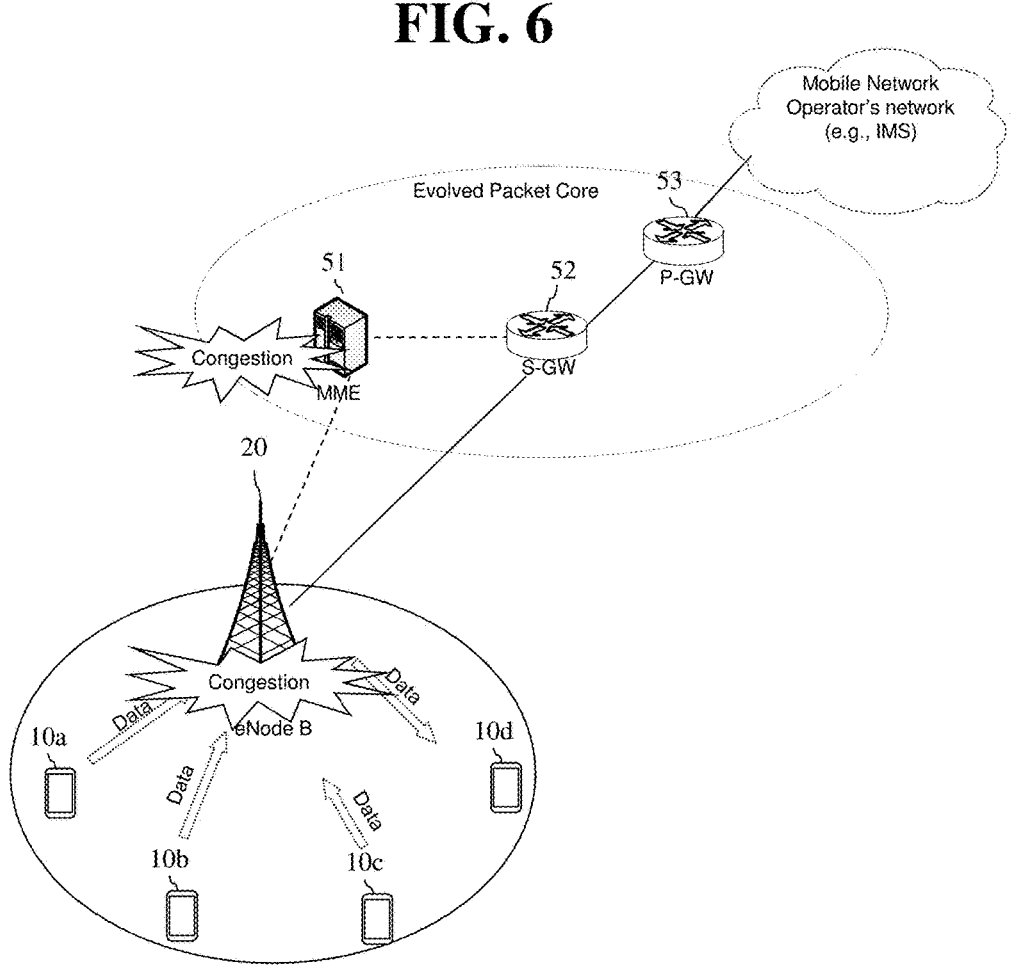
FIG. 6 exemplarily illustrates a network inability state.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UMTS: stands for Universal Mobile Telecommunication System and means a 3rd generation mobile communication network.

PLMN: as an abbreviation of Public Land Mobile Network, means a network identification number of a mobile communication provider.

UE/MS: User Equipment/Mobile Station. Means a terminal device.

EPC: stands for Evolved Packet Core and means a core network supportive of a long term evolution (LTE) network. An evolved version of UMTS.

PDN (Public Data Network): an independent network in which a service providing server is located.

PDN connection: connection from UE to PDN, i.e., association (connection) between a UE represented with an IP address and a PDN represented with an APN (access point name).

PDN-GW (Packet Data Network Gateway): a network node of an EPS network performing functions such as UE IP address allocation, packet screening & filtering, and charging data collection.

Serving GW (Serving Gateway): a network node of an EPS network performing functions such as mobility anchor, packet routing, idle mode packet buffering, and triggering MME to page UE.

PCRF (Policy and Charging Rule Function): a node of the EPS network which performs policy decision for dynamically applying QoS and charging policy differentiated for each service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): an End point ID of a tunnel configured among nodes in the networks and configured for each section per bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB.

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority).

OMA DM (Open Mobile Alliance Device Management): as a protocol designed to manage mobile devices such as a cellular phone, a PDA, a portable computer, and the like, performs functions including device configuration, firmware upgrade, error report, and the like.

OAM (Operation Administration and Maintenance): means a network management function group providing network failure display, performance information, and data and diagnosis function.

NAS (Non-Access-Stratum): upper stratum of a control plane between a UE and an MME.

Supports mobility management, session management, IP address management, etc. between a UE and a network.

NAS configuration MO (Management Object): means a management object (MO) used to configure parameters associated with NAS functionality in UE.

HLR (Home Location Register)/HSS (Home Subscriber Server): database (DB) representing subscriber information on in a 3GPP network.

MM (Mobility Management) operation/procedure: An operation or procedure for control/management/control of mobility of UE. The MM operation/procedure may be interpreted to include at least one of an MM operation/procedure in a CS network, a GMM operation/procedure in a GPRS network, and an EMM operation/procedure in an EPS network. The UE and the network nodes (MME, SGSN, and MSC) send and receive MM messages in order to perform the MM operation/procedure.

SM (Session Management) operation/procedure: An operation or procedure for controlling/managing/processing/handling a user plane and/or bearer context/PDP context of the UE. The SM operation/procedure may be interpreted to include at least one of an SM operation/procedure in the GPRS network and an ESM operation/procedure in the EPS network. The UE and the network nodes (MME and SGSN) send and receive SM messages in order to perform the SM operation/procedure.

Hereinafter, a disclosure of the specification will be described with reference to the drawings.

Figure 7:
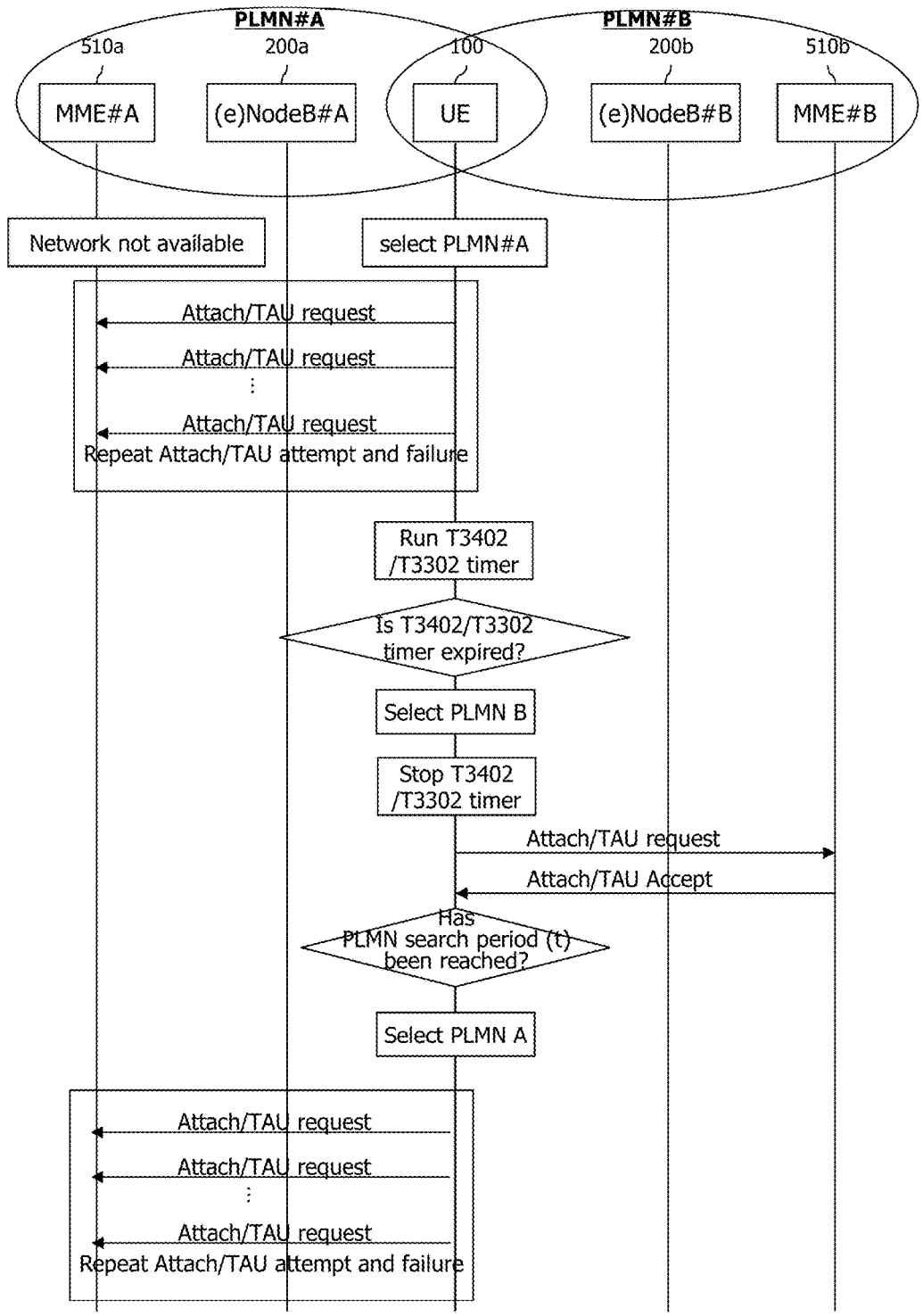
FIG. 7 illustrates a situation in which an attach request/TAU request is continuously unsuccessful in the network inability state.

FIG. 7 illustrates a situation in which an attach request/TAU request is continuously unsuccessful in the network inability state.

First, PLMN selection represents a process in which the UE 100 selects the PLMN in order to access a network (that is, PLMN) of a mobile communication provider in which the UE 100 subscribes when a power supply is turned on.

Prior to description with reference to FIG. 7, the PLMN selection process will be described below.

The PLMN selection process is performed as below. First, when the power supply of the UE 100 is turned on with a valid USIM, the UE 100 generally attempts registration in a PLMN in which the UE 100 is registered. When the registration is unsuccessful, an NAS layer of the UE 100 starts the PLMN selection. When the PLMN selection is started, an AS layer of the UE 100 performs a search operation of PLMNs which are usable. In this case, the UE 100 scans all frequencies in an E-UTRAN band which is supportable. The usable PLMNs found by the AS layer of the UE 100 are reported to the NAS layer. In this case, even associated radio access technology (RAT) information is together reported. The NAS layer of the UE 100 evaluates PLMN information reported by the AS layer and performs an operation of selecting the PLAM for registration while evaluation. In this case, the NAS layer of the UE 100 performs the PLMN selection by considering a priority of the PLMN/RAT stored in the USIM. The PLMN selection is divided into an automatic PLMN selection mode and a manual PLMN selection mode. The automatic PLMN selection mode allows the UE to select one usable PLMN from a PLMN list based on the priority. The manual PLMN selection mode allows a user to personally select one PLMN from a list of PLMNs provided by the AS of the UE. In the case of the automatic PLMN selection mode, a terminal selects the PLMN/RAT based on a predetermined order and attempts registration of the selected PLMN/RAT until the registration is successful. In the case of the manual PLMN selection mode, the UE shows the usable PLMN/RAT list to the user. In the automatic PLMN selection mode and the manual PLMN selection mode, the order of the PLMN/RAT may be exemplarily described as below.

PLMN list in HPLMN (Home PLMN) or PLMN list in EHPLMN (Equivalent HPLMN)

PLMN list in "User Controlled PLMN Selector with Access Technology"

PLMN list in "Operator Controlled PLMN Selector with Access Technology"

PLMN list reported in AS layer

MN list reported in AS layer

Meanwhile, when the UE 100 roams to another network, in the case where a combination list of PLMN/access technology having a high priority is present in the HPLMN (in the case where the ELPLMN list is not present or is empty), in the EHPLMN (in the case where the EHPLMN list is present), in a user controlled PLMN selector or an operator controlled PLMN selector from a VPLMN, the UE 100 selects the PLMN by periodically searching the PLMN in order to obtain a service. In this case, when the UE finds a PLMN having a higher priority than the PLMN which receives the service at present, the UE stores the corresponding PLMN in an equivalent PLMN list. The period of searching the PLMN is determined by a PLMN search period T value stored in the USIM. The PLMN search period T value may have a range of a 6-minute interval between 6 minutes and 8 hours. When the PLMN search period T value is not stored in the USIM, 60 minutes are applied as a basic value.

Meanwhile, in the case of the UE, a minimum periodic search timer (e.g., MinimumPeriodicSearchTimer) value may be set through a NAS management object (MO) and the value means a period value to minimally search the PLMN. The UE does not set the PLMN search period T value to a value smaller than the minimum periodic search timer (e.g., MinimumPeriodicSearchTimer) value. When the value stored in the USIM or the basic value (when not stored in the USIM) is smaller than the minimum periodic search timer (e.g., MinimumPeriodicSearchTimer) value, the PLMN search period T value is set to the minimum periodic search timer (e.g., MinimumPeriodicSearchTimer) value.

Meanwhile, the provider may operate the PLMN by dividing the RAT. For example, Deutsche Telekom may operate the PLMN like PLMN A (LTE network, highest) and PLMN B (UMTS network, secondary) and VZW may operate the PLMN like PLMN A (LTE network, highest) and PLMN B (UMTS network, secondary). In this case, the UE may receive the service by accessing PLMN B (secondary) at any moment in the HPLMM and thereafter, access PLMN A (LTE network) later according to the periodic PLMN search again. Therefore, in this case, the UE may select the PLMN having the high priority by searching the PLMN even in the HPLMN as the provider operates the network.

Hereinafter, an issue that causes the network inability state will be described below with reference to FIG. 7.

As illustrated in FIG. 7, when the power supply of the UE 100 is turned on, the UE 100 selects the PLMN which the UE 100 has previously accessed. It is assumed that the previously accessed PLMN is exemplarily the PLMN#A. In addition, it is assumed that the UE 100 receives an access/location update associated timer (e.g., T3402 timer/T3302 timer) from MME#A 510a in the previously accessed PLMN#A and stores the received access/location update associated timer.

Meanwhile, it is assumed that PLMN#A is in the network inability state and PLMN#B normally operates at the moment when the power supply of the UE 100 is turned on.

Then, the UE 100 transmits an attach request or tracking area update (TAU) request to MME#A 501a through an (e)NodeB 200a in PLMN#A. However, since the MME#A 100a is in an inability state, the MME#A 100a make no response, and as a result, the UE 100 performs retransmission multiple times. When such a failure is repeated five times, the UE 100 starts the access/location update associated timer (e.g., T3402 timer/T3302 timer). The T3402 timer as a timer provided by the MME in the case of an E-UTRAN/LTE service is primarily 12 minutes. The T3302 timer as a timer provided by an SGSN in the case of a UTRAN/UMTS service is primarily 12 minutes.

After the access/location update associated timer has expired, the UE 100 researches the PLMN to reselect PLMN#B.

Subsequently, the UE 100 stops the access/location update associated timer (e.g., T3402 timer/T3302 timer) in order to transmit the attach request/TAU request to an MME 510B in the PLMN#B. When the UE 100 receives an attach acceptance/TAU acceptance, the UE 100 may receive the service in the PLMN#B.

However, when reaching the PLMN search period T stored in the USIM while receiving the service in the PLMN#B, after providing the service with the PLMN#B, the UE 100 researches the PLMN. However, since PLMN#A has the higher priority than PLMN#B, the UE 100 selects PLMN#A again.

When the UE reselects PLMN#A which is in the inability state, the UE experiences service interruption. Further, the attach request/TAU request to the network of PLMN#A is unnecessarily repeated to cause network signaling to be wasted.

Figure 8:
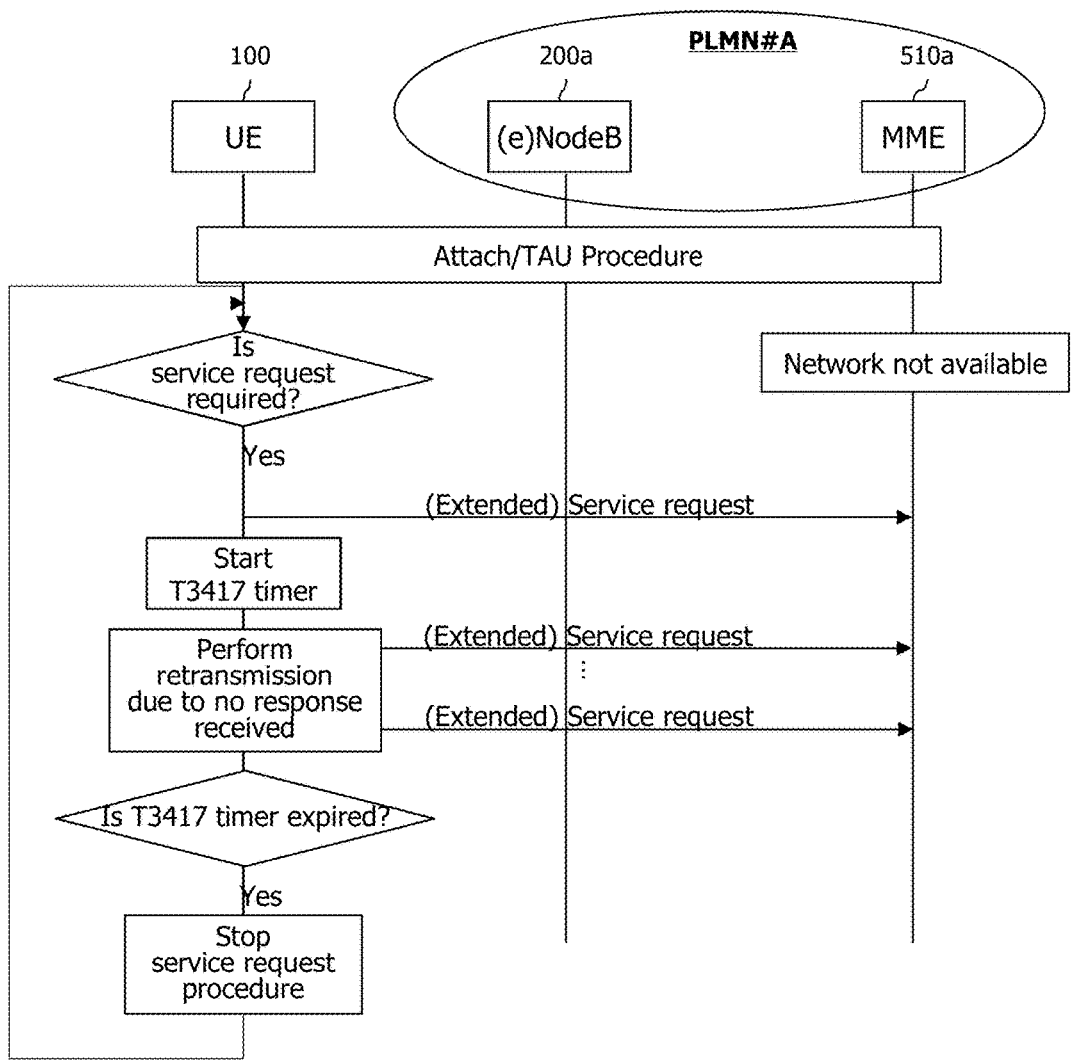
FIG. 8 illustrates a situation in which a service request procedure is continuously unsuccessful in the network inability state.

FIG. 8 illustrates a situation in which a service request procedure is continuously unsuccessful in the network inability state.

After the UE 100 completes the attach/TAU procedure, when PLMN#A is disabled, the service request procedure of the UE 100 may be infinitely repeatedly unsuccessful.

Prior to description with reference to FIG. 8, the service request procedure and a service request associated timer will be described in brief.

The service request procedure is performed when the UE 100 switches EMM-IDLE into an EMM-CONNECTED state or intends to configure an S1 bearer with a radio section for sending user data or an NAS control signal. Further, the service request procedure is performed for a mobile originating (MO) or mobile terminated (MT) circuit switching (CS) fallback or 1×CS fallback procedure. The service request procedure is started by transmitting a service request message or an extended service request message. The service request message is transmitted when the UE 100 intends to configure the S1 bearer with a radio section for transmitting general user data or NAS control signal. On the contrary, the extended service request message is transmitted to perform the mobile originating (MO) or mobile terminated (MT) circuit switching (CS) fallback or 1×CS fallback procedure. Further, the extended service request message may be transmitted even when UE having a low priority intends to configure the S1 bearer with the radio section for transmitting the user data or NAS control signal and in this case, the extended service request message is transmitted while a service type field is configured as "packet services via S1". When the UE receives an indication regarding completion of the bearer configuration from the AS layer or receives an indication regarding a system change in the case of a CS fallback, the UE may recognize that the service request procedure is successful and when the UE receives a service reject message from the network, the UE may recognize that the service request procedure is unsuccessful.

When the UE 100 transmits the service request message or the extended service request message, the NAS layer of the UE 100 starts the service request associated timer (e.g., T3417 timer or extended T3417 timer). The service request associated timer is used to recognize/determine the success and the failure o the service request procedure.

The T3417 timer and the extended T3417 are timers primarily set and operated in the UE for an E-UTRAN/LTE service and as basic values, the T3417 timer is 5 seconds and the extended T3417 timer is 10 seconds. The T3417 timer is started when transmitting the service request message, transmitting the extended service request message to perform a 1×CS fallback, or when the UE having the low priority transmits the extended service request message by configuring the service type field to "packet services via S1". In addition, the T3417 timer is stopped when receiving an indication indicating that the bearer is set up from the AS layer or receiving the service reject message from the network. However, when the T3417 timer has expired while there is no response which is received, the service request procedure is stopped. On the contrary, the extended T3417 timer is started when transmitting the extended service request message in order to perform the MO/MT CS fallback. In addition, the extended T3417 timer is stopped when receiving an indication indicating that the system change is successful or unsuccessful from the AS layer or receiving the service reject message from the network. However, when the extended T3417 timer has expired while there is no response which is received, changing the RAT to GERAN/UTRAN s performed or an associated service request procedure is stopped.

Hereinafter, the issue that causes the network inability state will be described with reference to FIG. 8.

As illustrated in FIG. 8, when the service request is required while PLMN#A is in the inability state, the UE 100 transmits the service request or the extended service request to the MME 510a through the (e)NodeB 200a.

Subsequently, the UE 100 starts the service request associated timer (e.g., T3417 timer).

When the UE 100 may not receive the response from the MME 510a, the UE 100 retransmits the service request before the timer has expired.

When the service request associated timer has expired, the UE 100 stops the service request procedure at last.

However, when the service request is again required by an application in the UE 100, and the like, the UE 100 transmits the service request again and continuously experiences the failure.

As a result, the UE 100 experiences service interruption. Further, the service request is unnecessarily repeated to cause the network signaling to be wasted.

Accordingly, the disclosures of the specification present schemes for solving the problem.

BRIEF DESCRIPTION OF DISCLOSURES OF SPECIFICATION

A first disclosure of the specification presents a scheme for solving the problem illustrated in FIG. 7. In addition, a second disclosure of the specification presents a scheme for solving the problem illustrated in FIG. 8.

First, the first disclosure of the specification will be described below in brief.

First, the first disclosure of the specification aims at preventing the attach request/TAU request from being unnecessarily attempted, even though a problem occurs in a PLMN having the high priority, as the PLMN in which the problem occurs is reselected again through a PLMN reselection process. To this end, a first embodiment of the first disclosure associates the access/location update associated timer (e.g., T3402 timer/T3302 timer) with a per PLMN indication to allow the access/location update associated timer to operate per PLMN. By this configuration, until the access/location update associated timer which is in operation with respect to the PLMN, the corresponding PLMN is not reselected and the attach procedure/TAU procedure is not performed. The access/location update associated timer and the per PLMN indication may be transferred to the UE through an attach acceptance message, a TAU acceptance message, and an RAU acceptance message before the PLMN is disabled. The per PLMN indication may have a value of 0 or 1 and 0 may mean that the access/location update associated timer does not operate per PLMN but operate similarly to the related art and 1 may mean that the access/location update associated timer per PLMN. For example, in the case where PLMN#A, PLMN#B, and PLMN#C are present, when the UE receives the access/location update associated timer and the per PLMN indication value of 1 in PLMN#A, the UE may operate the access/location update associated timer with respect to the PLMN#A and may not operate the access/location update associated timer with respect to the PLMN#B and the PLMN#C. However, when the UE receives the access/location update associated timer and the per PLMN indication value of 0 in PLMN#B, the UE may apply the access/location update associated timer not per PLMN but like the related art with respect to the PLMN#B. Meanwhile, in a second embodiment of the first disclosure, before the corresponding PLMN is disabled, the value of the access/location update associated timer received through the attach acceptance message, the TAU acceptance message, and the RAU acceptance message and the PLMN search period T stored in the USIM are compared with each other and thereafter, the value of the PLMN search period T is set to be equal to or larger than the value of the access/location update associated timer. As such, the reason for adjusting the PLMN search period T long is to reselect the corresponding PLMN before the network inability is at least solved.

Next, the second disclosure of the specification will be described below in brief.

The second disclosure of the specification aims at preventing the service request procedure from being unnecessarily repeated even though the service request associated timer (e.g., T3417 timer or extended T3417 timer) which the UE is starting expired when the network is in the inability state. To this end, in the second disclosure of the specification, the response may not be received until the service request associated timer has expired to increase a value of a counter one by one whenever the service request procedure is unsuccessful and when the value of the counter reaches an upperlimit threshold, a specific timer (e.g., T3402 timer or T3302 timer) operates again and the service request procedure is prevented from being repeated before the specific timer has expired. That is, after the specific timer has expired, the service request procedure is reattempted or the PLMN is allowed to be reselected at last. The second disclosure may be applied even in the case where the service request procedure is unsuccessful by receiving the service reject message including a special cause value as well as the case where the service request procedure is unsuccessful as the response may not be received until the service request associated timer has expired. In this case, the special cause value may be a new cause value indicating the network inability or a cause value used in the related art.

Alternatively, the UE 100 transmits the extended service request message in which the service type field is configured as "packet services via S1", but when transmitting the extended service request message is unsuccessful until the counter value reaches the upperlimit threshold, the UE 100 stops the service request procedure and performs a specific TAU procedure (e.g., TAU with neither S-TMSI nor registered MME identifier procedure). The specific TAU procedure which the UE 100 starts allows the (e)NodeB to reselect the MME to thereby find an MME which normally operates. Accordingly, the UE 100 may perform the service request to the MME which normally operates.

Meanwhile, in the related art, the counter is used in the attach procedure or TAU procedure, but not used with respect to the service request procedure. In the case of the attach procedure or TAU procedure, when the attach request or TAU request is unsuccessful, reattempt needs to be periodically performed. For example, the attach request or TAU request is made for a specific service of the terminal, e.g., a mobile originating (MO) service or mobile terminated (MT), but when the attach request or TAU request is unsuccessful, the reattempt needs to be periodically performed. However, in the case of the service request procedure, it is enough when the reattempt is performed only in the case where the general application of the UE is required and the reattempt need not be periodically performed, and as a result, the counter is not used. However, in recent years, since various applications have been installed in the UE and some among them always require connectivity (always-on connectivity), when the service request is unsuccessful, performing the periodic reattempt is more preferable. Therefore, in the second disclosure of the specification, the periodic reattempt is enabled in spite of the service request procedure and when the network is disabled, the counter is intended to be introduced in order to restrain the unnecessary reattempt when the network is disabled.

Hereinafter, the first disclosure of the specification will be described with reference to FIGS. 9 to 13 and the second disclosure of the specification will be described with reference to FIGS. 14 to 16.

Figure 9:
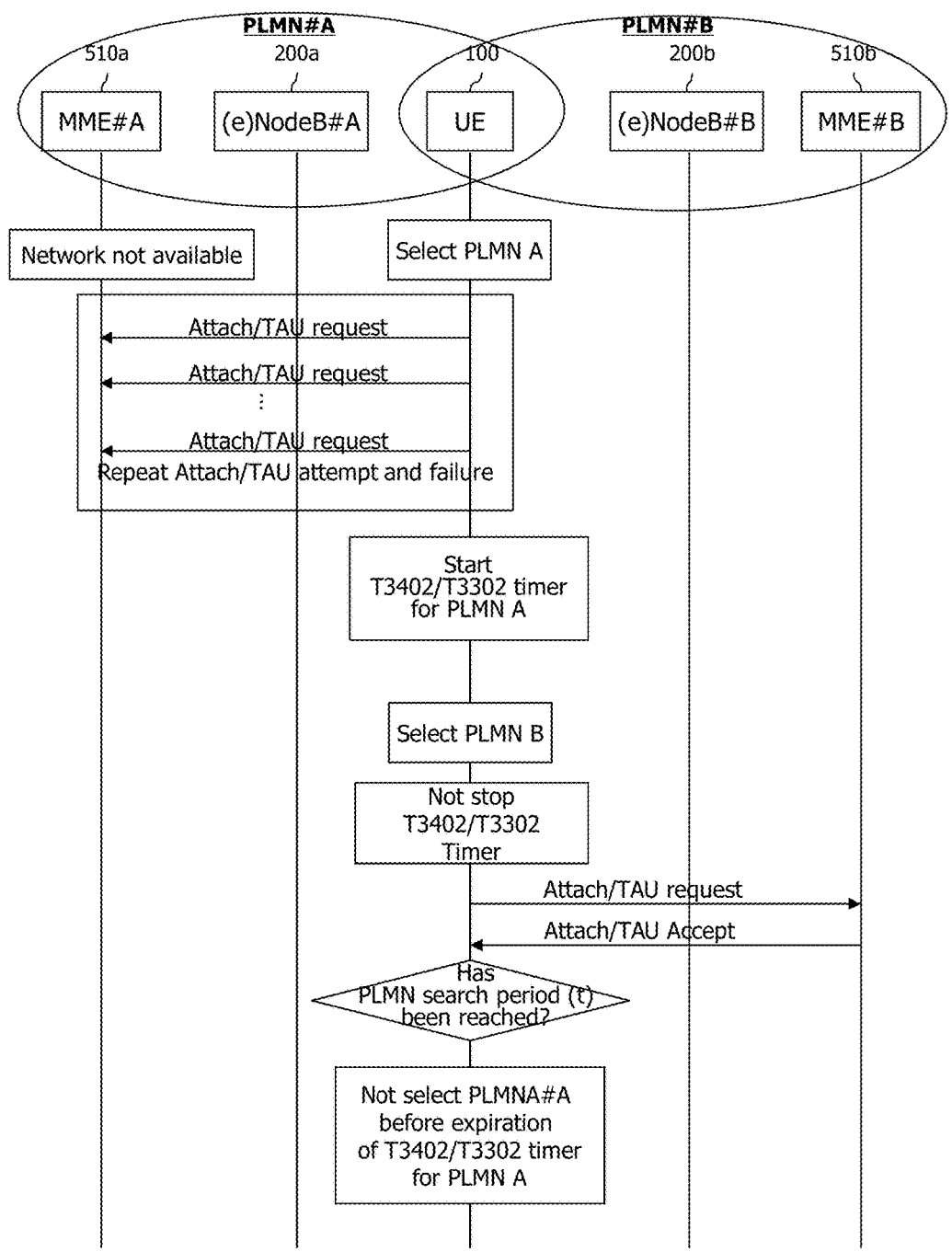
FIG. 9 is a flowchart illustrating a first embodiment of a first disclosure of the specification.

FIG. 9 is a flowchart illustrating a first embodiment of a first disclosure of the specification.

As known with reference to FIG. 9, when the power supply of the UE 100 is turned on, the UE 100 selects the PLMN#A which the UE 100 has previously accessed. Herein, it is assumed that when the UE 100 previously accessed the PLMN#A, the UE 100 receives the access/location update associated timer (e.g., T3402 timer/T3302 timer) associated with the per PLMN indication.

Meanwhile, it is assumed that PLMN#A is in the network inability state and PLMN#B normally operates at the moment when the power supply of the UE 100 is turned on.

Then, the UE 100 transmits an access request, e.g., the attach request or a location update request, e.g., the tracking area update (TAU) request to the MME#A 501a through the (e)NodeB 200a in PLMN#A. However, since the MME#A 100a is in an inability state, the MME#A 100a make no response, and as a result, the UE 100 performs retransmission multiple times.

When such a failure is repeated five times, the UE 100 starts the access/location update associated timer (e.g., T3402 timer/T3302 timer). In this case, when the value of the per PLMN indication is 0, the access/location update associated timer (e.g., T3402 timer/T3302 timer) is started as illustrated in FIG. 7, but when the value of the per PLMN indication is 1, the access/location update associated timer (e.g., T3402 timer/T3302 timer) is started only with respect to the PLMN#A. Hereinafter, in FIG. 1, it will be described assumed that the access/location update associated timer is started only with respect to the PLMN#A when the value of the indication is 1.

While the access/location update associated timer for the PLMN#A is started, the UE 100 reselects PLMN#B through the PLMN reselection process and transmits the access request, e.g., the attach request or the location update request, e.g., the TAU request to an MME#B 510b in the PLMN#B.

However, in this case, according to the first disclosure of the specification, although the attach request/TAU request is transmitted to the MME#B 510b in the PLMN#B, since the access/location update associated timer is started with respect to the PLMN#A, the access/location update associated timer is not stopped and is continuously maintained.

Since the access/location update associated timer is not stopped as described above and the access/location update associated timer is started with respect the PLMN#A, although the UE 100 reaches a PLMN reselection period T stored in the USIM, the UE 100 does not select the PLMN#A, and as a result, the UE 100 may not transmit an attach request message or TAU request message to the MME#a 510a in the PLMN#A.

The UE 100 may select the PLMN#A at last after the access/location update associated timer for the PLMN#A has expired.

The first embodiment for the first disclosure of the specification may be similarly applied even to the RAU procedure in the UTRAN/UMTS.

Figure 10:
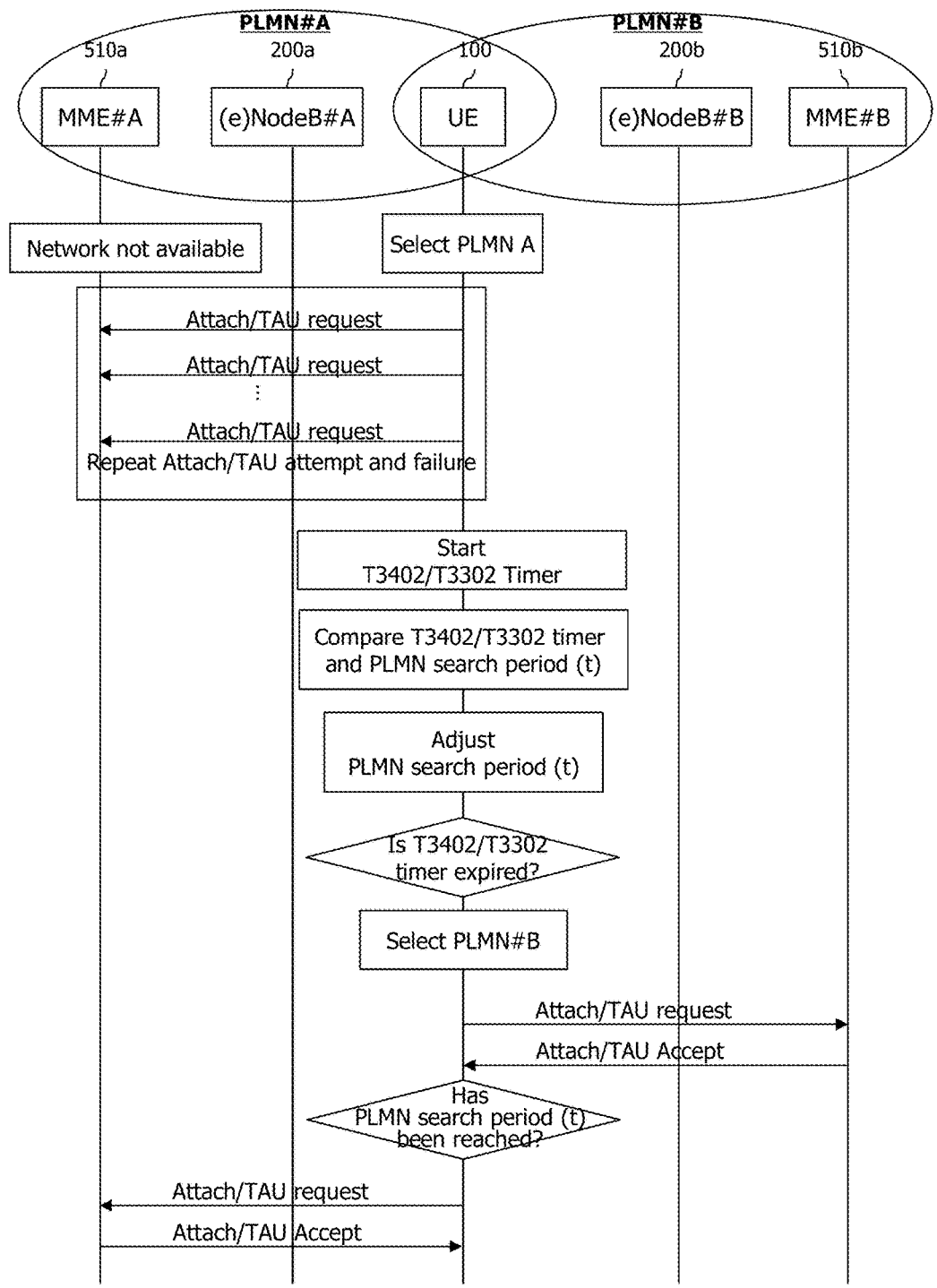
FIG. 10 is a flowchart illustrating a second embodiment of the first disclosure of the specification.

FIG. 10 is a flowchart illustrating a second embodiment of the first disclosure of the specification.

As known with reference to FIG. 10, when the power supply of the UE 100 is turned on, the UE 100 selects the PLMN#A which the UE 100 has previously accessed. Herein, it is assumed that the UE 100 receives the access/location update associated timer (e.g., T3402 timer/T3302 timer) from the MME#A 510a in the previously accessed PLMN#A.

Meanwhile, it is assumed that PLMN#A is in the network inability state and PLMN#B normally operates at the moment when the power supply of the UE 100 is turned on.

Then, the UE 100 transmits the access request, e.g., the attach request or the location update request, e.g., the tracking area update (TAU) request to the MME#A 501a through the (e)NodeB 200a in the PLMN#A. However, since the MME#A 100a is in the inability state, the MME#A 100a may make no response, and as a result, the UE 100 performs retransmission multiple times.

When such a failure is repeated five times, the UE 100 starts the access/location update associated timer (e.g., T3402 timer/T3302 timer).

In addition, the UE 100 compares the value of the access/location update associated timer (e.g., T3402 timer/T3302 timer) and the value of the PLMN reselection period T stored in the USIM.

According to the comparison, when it is verified that the value of the PLMN reselection period T stored in the USIM is smaller than the value of the access/location update associated timer (e.g., T3402 timer/T3302 timer), the UE 100 adjust the value of the PLMN reselection period T. For example, the UE 100 adjusts the value of the PLMN reselection period T to be still larger than the value of the access/location update associated timer.

Thereafter, when the access/location update associated timer has expired, the UE 100 researches the PLMN to reselect the PLMN#B.

Subsequently, the UE 100 transmits the attach request/TAU request to the MME 510b in the PLMN#B. When the UE 100 receives the attach acceptance/TAU acceptance, the UE 100 may receive the service in the PLMN#B.

However, since the value of the PLMN reselection period T is adjusted to be larger than the value of the access/location update associated timer, the PLMN#A which is in the inability state is prevented from being reselected for a while.

The contents of the second embodiment for the first disclosure of the specification described up to now may be similarly applied even to the RAU procedure.

Meanwhile, the first embodiment and the second embodiment may be combined with each other. For example, the UE 100 may receive an access/location update associated timer associated with the per PLMN indication. When the attach request/TAU request for the PLMN#A is unsuccessful five times or more, the UE 100 starts the access/location update associated timer (e.g., T3402 timer/T3302 timer) with respect to the PLMN#A. After starting the access/location update associated timer, the UE 100 may adjust the value of the PLMN reselection period T stored in the USIM to be larger than the access/location updated associated timer. As such, an example of the combination of the first embodiment and the second embodiment may be applied even to the RAU procedure.

Figure 11:
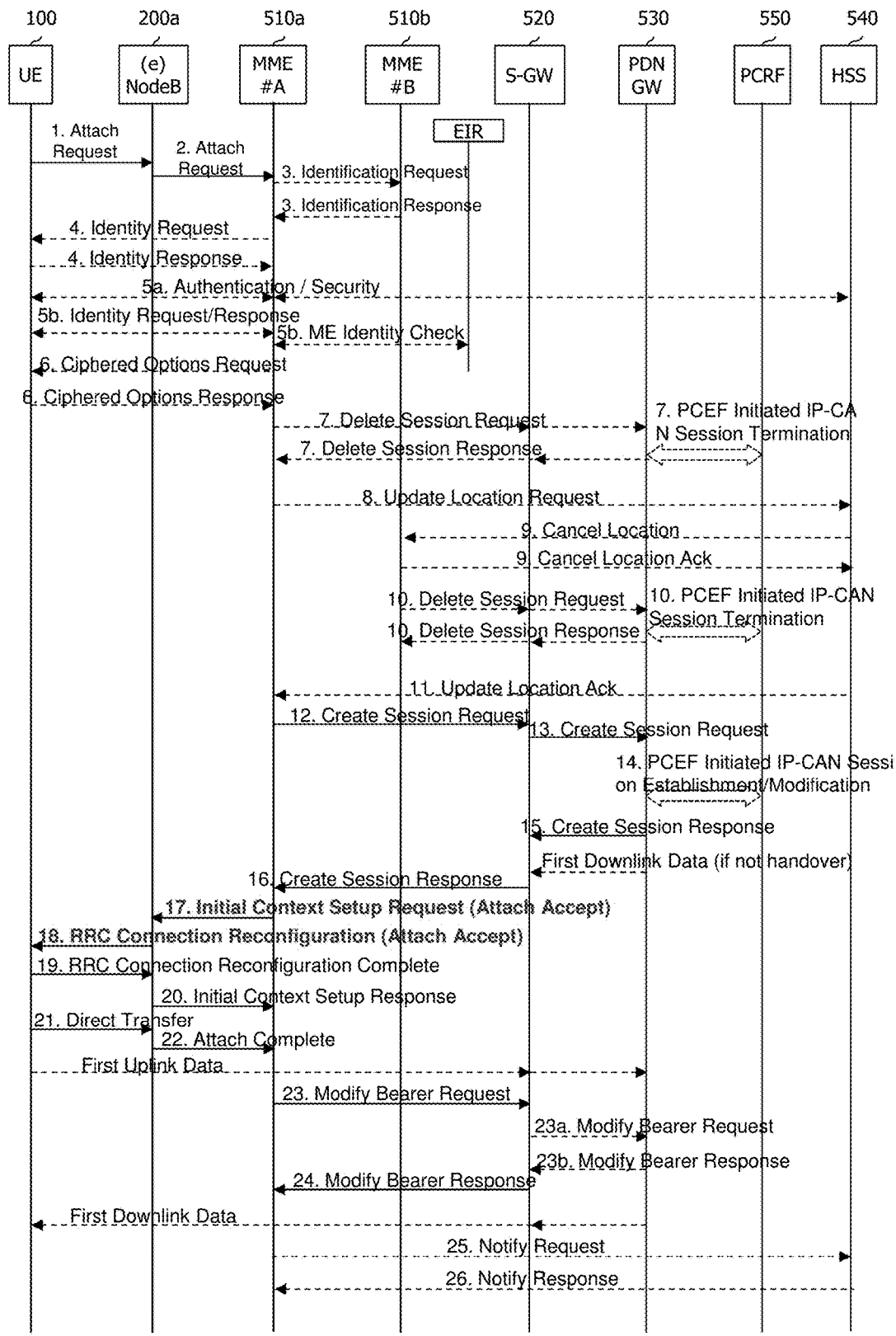
FIG. 11 is a flowchart illustrating, in detail, an attach procedure illustrated in FIG. 9.

FIG. 11 is a flowchart illustrating, in detail, an attach procedure illustrated in FIG. 9.

While described above with reference to FIG. 9, it is assumed that before the PLMN#A is in the inability state, the UE 100 receives the access/location update associated timer (e.g., T3402 timer/T3302 timer) associated with the per PLMN indication by accessing the PLMN#A. As such, receiving the access/location update associated timer (e.g., T3402 timer/T3302 timer) associated with the per PLMN indication may be achieved through the attach accept message illustrated in $17^{th}$ and $18^{th}$ processes of FIG. 11.

Figure 12:
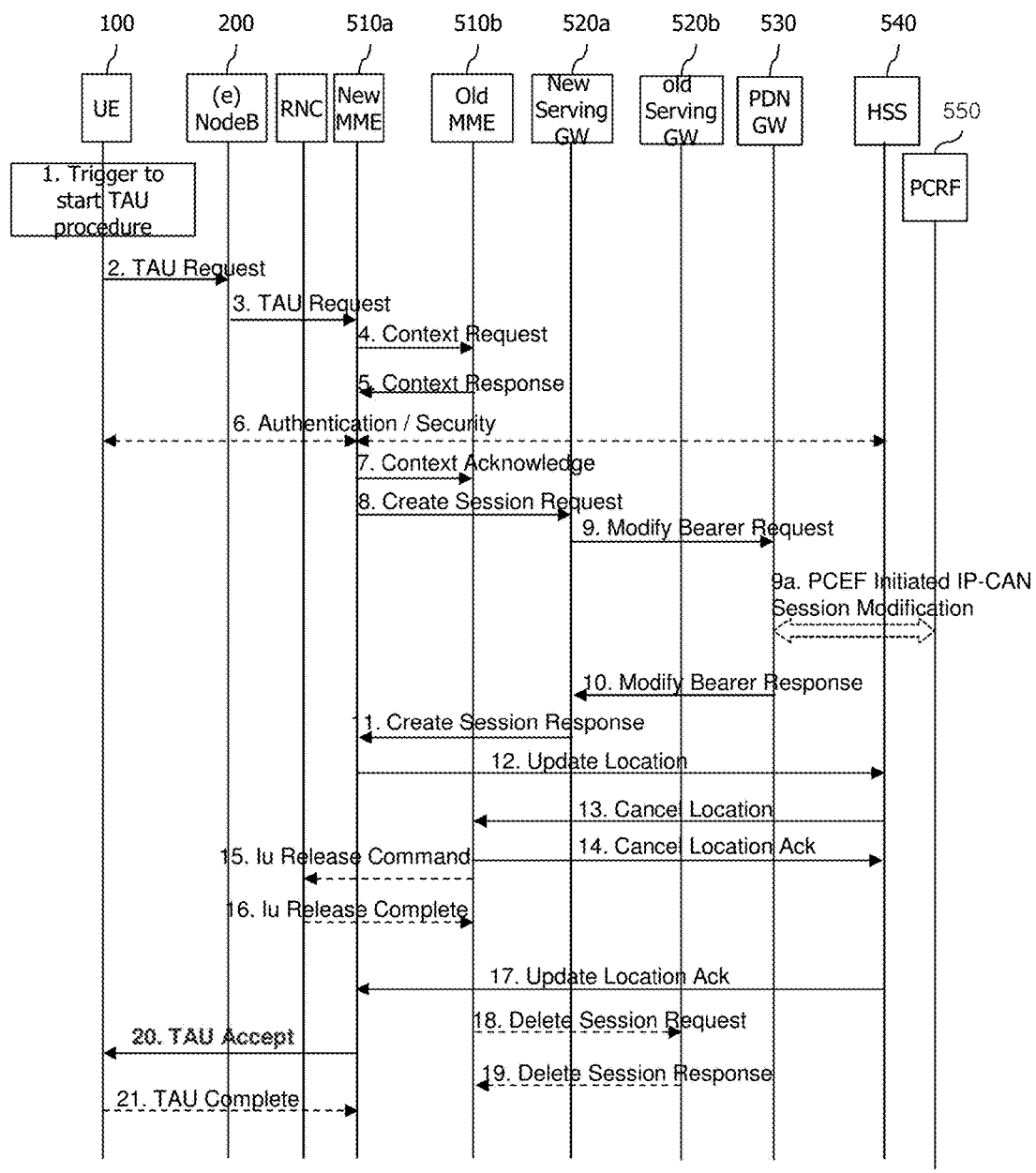
FIG. 12 is a flowchart illustrating, in detail, a TAU procedure illustrated in FIG. 9.

FIG. 12 is a flowchart illustrating, in detail, a TAU procedure illustrated in FIG. 9.

Receiving the access/location update associated timer (e.g., T3402 timer/T3302 timer) associated with the per PLMN indication may be achieved through the TAU accept message illustrated in a $20^{th}$ process of FIG. 12.

Figure 13:
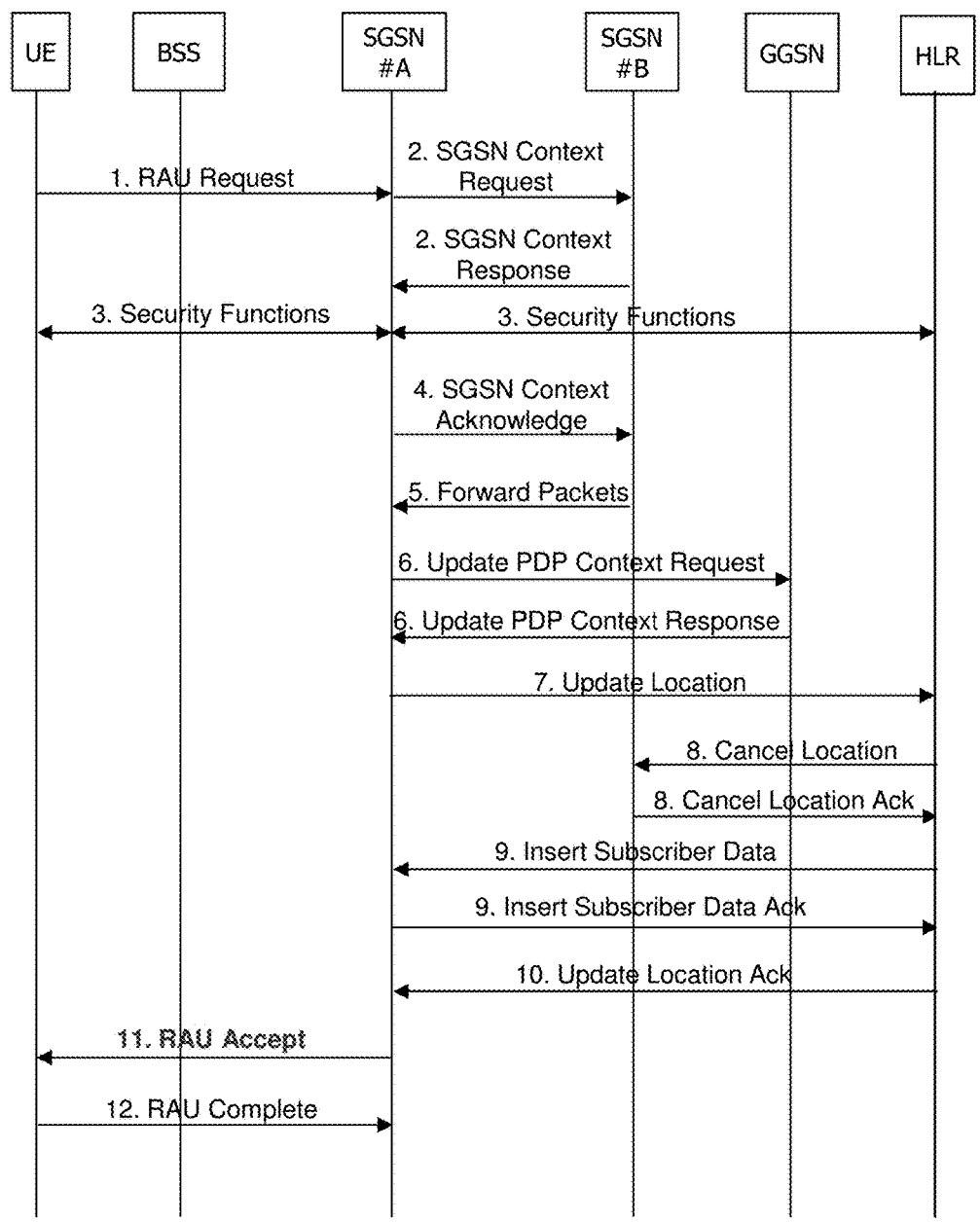
FIG. 13 is a flowchart illustrating an RAU procedure to which the first embodiment for the first disclosure of the specification can be applied.

FIG. 13 is a flowchart illustrating an RAU procedure to which the first embodiment for the first disclosure of the specification can be applied.

As described once above, the first embodiment for the first disclosure may be applied even to the RAU procedure. When the first embodiment is to be applied to the RAU procedure, the location update associated timer associated with the per PLMN indication, that is, the T3302 timer may be received while being included in the routing area update (RAU) accept message illustrated in an $11^{th}$ process of FIG. 13.

Hereinafter, the second disclosure of the specification will be described.

Figure 14:
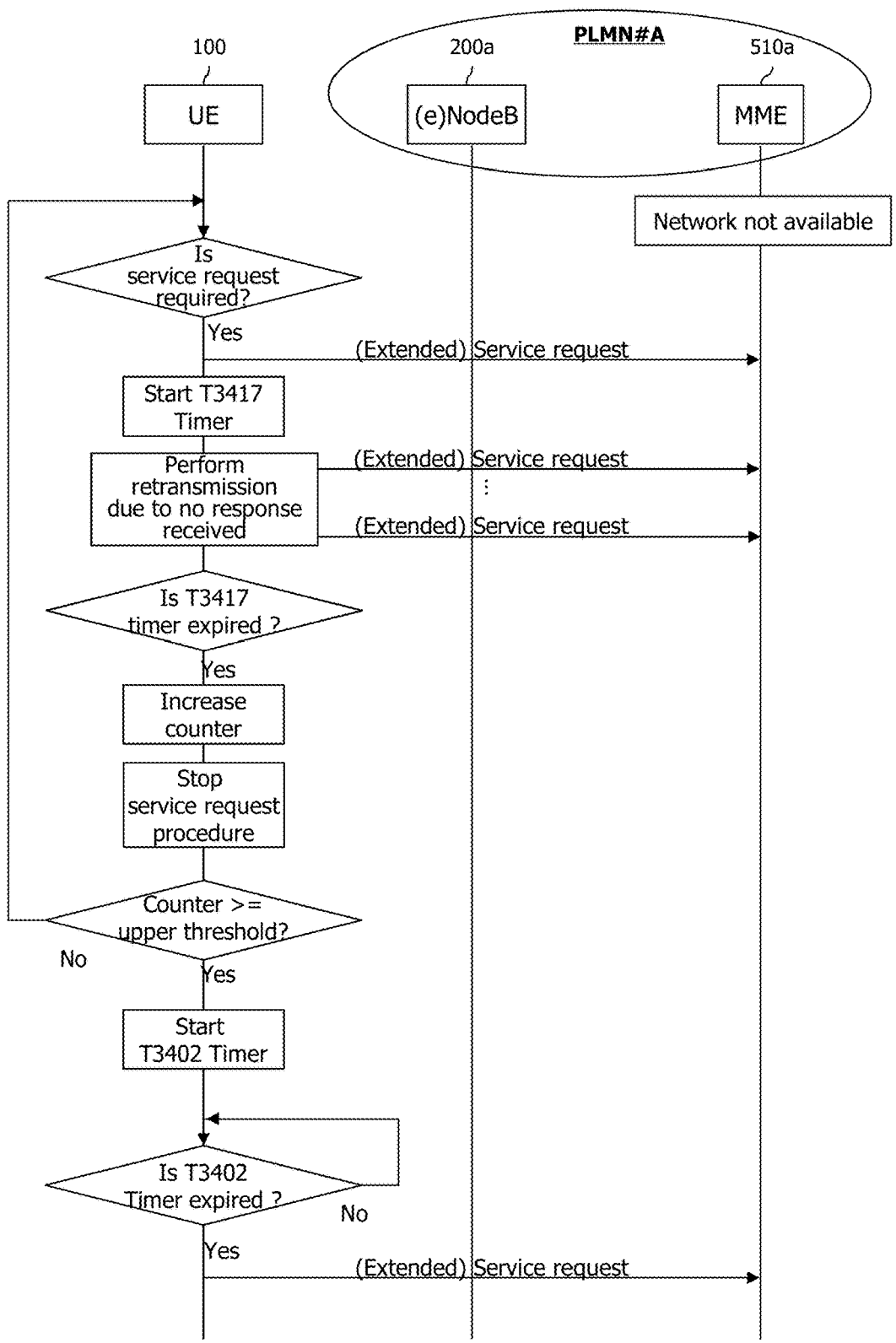
FIG. 14 is a flowchart illustrating a first embodiment of a second disclosure of the specification.

FIG. 14 is a flowchart illustrating a first embodiment of a second disclosure of the specification.

As illustrated in FIG. 14, when the service request is required while PLMN#A is in the inability state, the UE 100 transmits the service request message or the extended service request message to the MME 510a through the (e)NodeB 200a. The service request message or the extended service request message may include the service type field configured as "packet services via S1".

Subsequently, the UE 100 starts the service request associated timer (e.g., T3417 timer or extended T3417 timer).

When the UE 100 may not receive the response from the MME 510a, the UE 100 retransmits the service request message or the extended service request message until the timer has expired. Alternatively, even when the service reject message or the extended service reject message is received and a specific cause value is included in the message, retransmission may be performed.

When the service request associated timer has expired, the UE 100 increases the counter by 1 and the UE 100 stops the service request procedure.

While the value of the counter is not equal to or larger than the upperlimit threshold, when the service request is required, the UE 100 may transmit the service request or the extended service request to the MME 510a through the (e)NodeB 200a again.

However, when the value of the counter is equal to or larger than the upperlimit threshold, the UE 100 starts a specific timer, e.g., a T3402 timer or T3302 timer. The T3402 timer as a timer provided by the MME for the E-UTRAN/LTE service is primarily set to 12 minutes. The T3302 timer is a value provided by an SGSN for a UTRAN/UMTS service and is primarily set to 12 minutes.

The reason for starting the specific timer, e.g., the T3402 timer or T3302 timer is not to make the service request to the MME 510a of the PLMN#A until the inability of the PLMN#A is solved. Therefore, the UE 100 may make the service request to the MME 510a of the PLMN#A at last after the specific timer has expired. Alternatively, when the specific timer has expired, the UE may perform a PLMN reselection process.

The second disclosure of the specification allows the service request procedure to be periodically reattempted until the value of the counter reaches the upperlimit threshold and to restrain an unnecessary reattempt when the value of the counter reaches the upperlimit threshold.

The first embodiment of the second disclosure described up to now may be applied even to the service request procedure in the UTRAN/UMTS.

Figure 15:
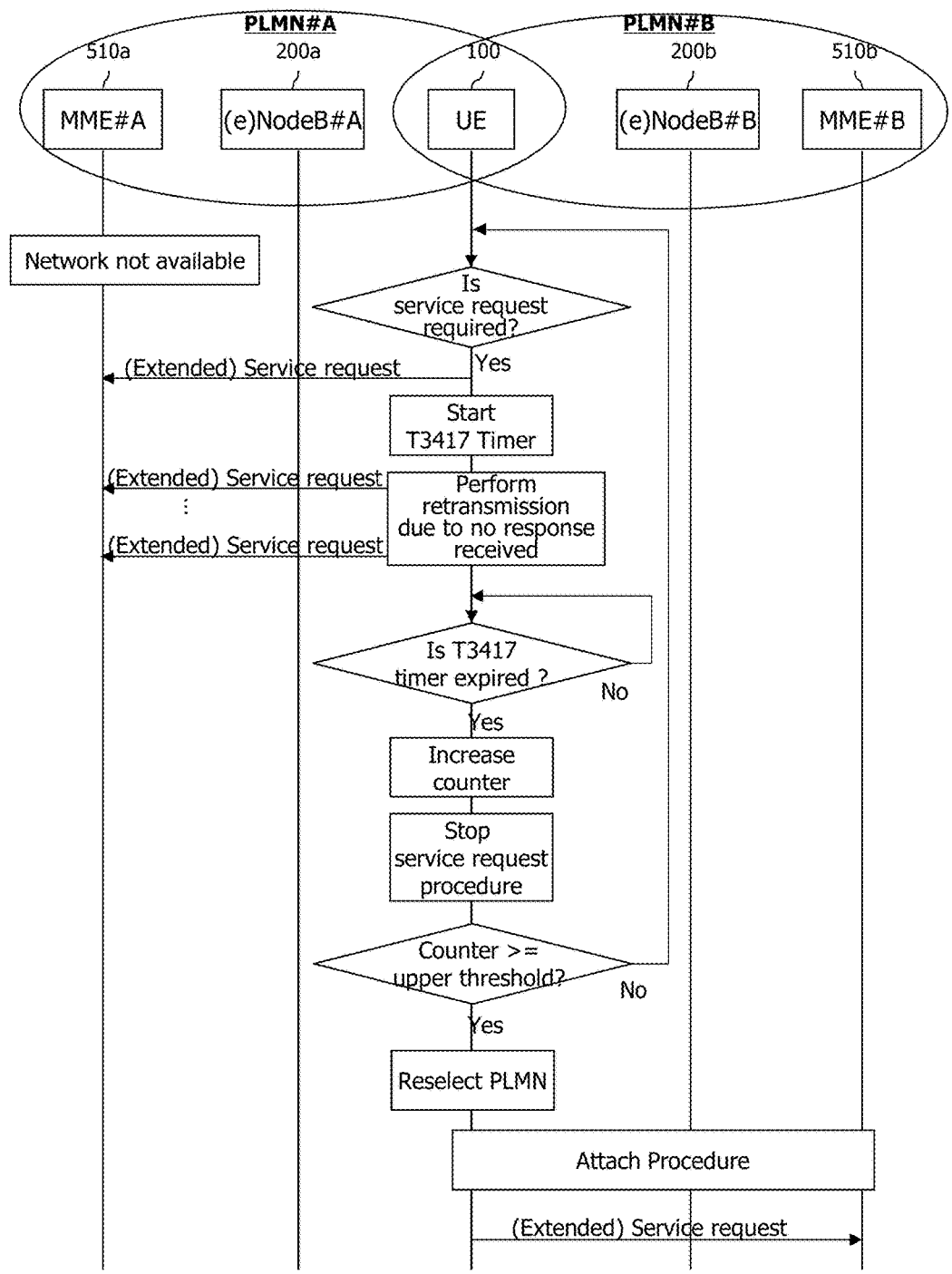
FIG. 15 is a flowchart illustrating a second embodiment of the second disclosure of the specification.

FIG. 15 is a flowchart illustrating a second embodiment of the second disclosure of the specification.

The second embodiment illustrated in FIG. 15 is almost similar to the first embodiment illustrated in FIG. 14. Hereinafter, only a part differentiated from the first embodiment illustrated in FIG. 14 will be described.

In detail, as illustrated in FIG. 15, in the second embodiment, when the value of the counter is equal to or larger than the upperlimit threshold, the PLMN reselection process is performed, and as a result, the UE 100 performs the attach procedure to the MME#B 510b in the PLMN#B which normally operates instead of the PLMN#A which is disabled and thereafter, performs the service request procedure.

Figure 16:
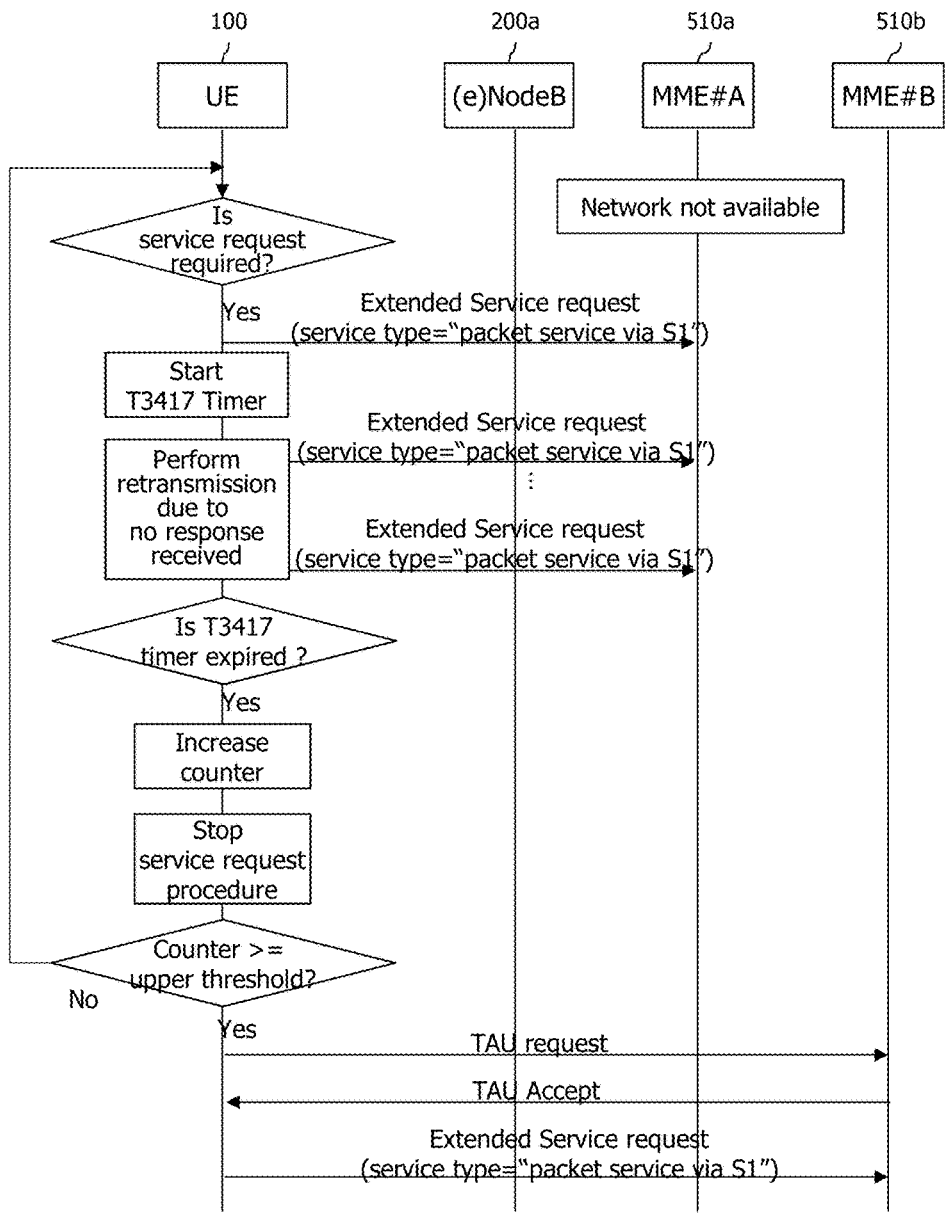
FIG. 16 is a flowchart illustrating a third embodiment of the second disclosure of the specification.

FIG. 16 is a flowchart illustrating a third embodiment of the second disclosure of the specification.

The third embodiment illustrated in FIG. 16 is almost similar to the first embodiment illustrated in FIG. 14 and the second embodiment illustrated in FIG. 15. Hereinafter, only a part differentiated from the first embodiment illustrated in FIG. 14 and the second embodiment illustrated in FIG. 15 will be described.

In detail, as illustrated in FIG. 16, in the third embodiment, when the value of the counter is equal to or larger than the upperlimit threshold, the TAU process is performed, and as a result, the UE 100 reselects the MME#B 510b which normally operates instead of the PLMN#A 510a which is disabled and thereafter, performs the service request procedure.

The processes illustrated in the respective drawings described up to now need not always be performed and only some steps may be performed according to a situation.

The contents described so far may be implemented in hardware. Such an implementation is described with reference to FIG. 17.

Figure 17:
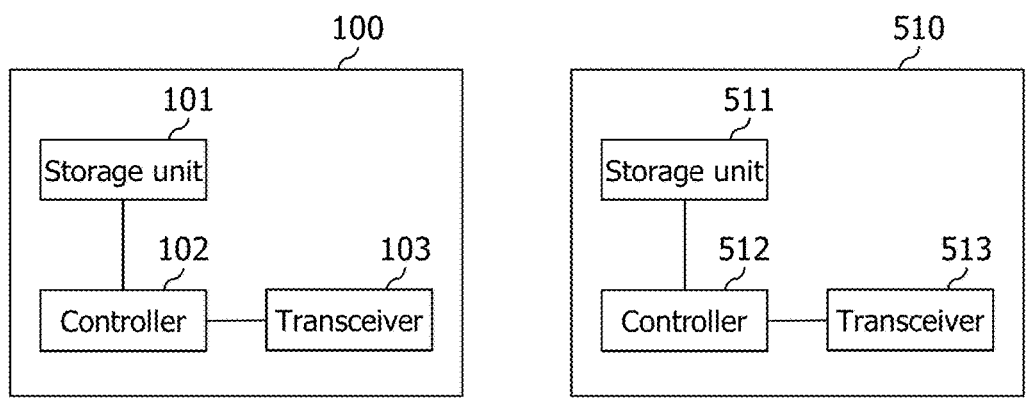
FIG. 17 is a configuration block diagram of a UE 100 and an MME 510 by the disclosures of the specification.

FIG. 17 is a block diagram of the UE 100 and the MME 510 in accordance with an embodiment of the present invention.

As shown FIG. 17, the UE 100 includes memory means 101, a controller 102, and a transceiver unit 103. Furthermore, the MME 510 includes memory means 511, a controller 512, and a transceiver unit 513.

The memory means (101, 511) stores the methods shown in FIGS. 8 to 19.

The controller (102, 512) controls the memory means (101, 511) and the transceiver unit (103, 513). To be concrete, the controller (102, 512) executes the methods stored in the memory means (101, 511). Furthermore, the controller (102, 512) sends the aforementioned signals through the transceiver unit (103, 513).

Although the preferred embodiments of the present invention have been illustratively described, the scope of the present invention is not limited to only the specific embodiments, and the present invention can be modified, changed, or improved in various forms within the spirit of the present invention and within a category written in the claims.

What is claimed is:

1. A method for service request, the method performed by a user equipment (UE) and comprising:
   transmitting, by a non-access-stratum (NAS) layer of the UE, a service request message to a first mobility management entity (MME) in a first public land mobile network (PLMN);
   running, by the NAS layer of the UE, a first timer related to the service request message;
   determining, by the NAS layer of the UE, whether to increase a counter;
   increasing, by the NAS layer of the UE, the counter when, after transmitting the service request message multiple times, a response message is not received before the first timer has expired;
   comparing, by the NAS layer of the UE, a value of the counter with a threshold; associating with the first PLMN a second timer, being run by the NAS layer of UE, when the value of the counter is greater than or equal to the threshold,
   wherein the second timer associated with the first PLMN is further run by the NAS layer of the UE, when a service reject message including a cause value indicates that a network is unavailable is received,
   wherein a transmission of the service request message to the first MME in the first PLMN is prevented while the second timer is running;
   performing one of a PLMN reselection procedure and a tracking area update (TAU) procedure after the second timer expires, wherein the TAU procedure is used to trigger a MME reselection procedure;
   transmitting, via the NAS layer of the UE, an access request message or a TAU request message to a second MME in a second PLMN after the second timer has expired; and
   transmitting, via the NAS layer of the UE, a service request message to the second network node.

2. The method of claim 1, further comprising:
   transmitting, via the NAS layer of the UE, the service request message when a service request is required and when the value of the counter is less than the threshold.

3. The method of claim 1, further comprising:
   transmitting, via the NAS layer of the UE, the service request message when a service request is required after the second timer has expired.

4. The method of claim 1, wherein the access request message is an attach request message.

5. The method of claim 1, wherein the first timer is a T3417 timer or an extended T3417 timer.

6. The method of claim 1, wherein the second timer is a T3402 timer or a T3302 timer.

7. The method of claim 1, wherein the service request message corresponds to at least one of a service request message and an extended service request message.

8. A user equipment (UE) comprising:
   a transceiver; and
   a processor that controls a radio resource control (RRC) layer and a non-access-stratum (NAS) layer, wherein the processor:
   controls the transceiver to transmit, via the NAS layer, a service request message to a first mobility management entity (MME) in a first public land mobile network (PLMN);
   runs, via the NAS layer, a first timer related to the service request message;
   determines whether to increase, via the NAS layer, a counter;
   increases, via the NAS layer, the counter when, after the service request message has been transmitted multiple times, a response message is not received before the first timer has expired;
   compares, via the NAS layer, a value of the counter with a threshold; associates with the PLMN a second timer, running via the NAS layer, when the value of the counter is greater than or equal to the threshold, wherein the second timer associated with the first PLMN is further run by the NAS layer of the UE, when a service reject message including a cause value indicates that a network is unavailable is received, wherein a transmission of the service request message to the first MME in the first PLMN is prevented while the second timer is running;
   performs one of a PLMN reselection procedure and a tracking area update (TAU) procedure after the second timer expires, wherein the TAU procedure is used to trigger a MME reselection procedures;
   wherein the processor:
   further controls the transceiver to transmit, via the NAS layer, an access request message or a TAU request message to a second MME in a second PLMN after the second timer has expired, and a service request message.

9. The UE of claim 8, wherein the processor further:
   controls the transceiver to transmit, via the NAS layer, the service request message when a service request is required and when the value of the counter is less than the threshold.

10. The UE of claim 8, wherein the processor further:
    controls the transceiver to transmit, via the NAS layer, the service request message when a service request is required after the second timer has expired.

* * * * *